Dec. 22, 1925.

E. J. MALONE, JR 1,566,554

MOTOR VEHICLE

Filed Feb. 14, 1925  2 Sheets-Sheet 1

WITNESSES

INVENTOR
Edward J. Malone, Jr.,
BY
Alexander C. Proudfit,
ATTORNEY

Dec. 22, 1925.

E. J. MALONE, JR 1,566,554

MOTOR VEHICLE

Filed Feb. 14, 1925

WITNESSES

INVENTOR
Edward J. Malone, Jr.,
BY
Alexander C. Proudfit,
ATTORNEY

Patented Dec. 22, 1925.

1,566,554

UNITED STATES PATENT OFFICE.

EDWARD J. MALONE, JR., OF MONTCLAIR, NEW JERSEY, ASSIGNOR TO CENTURY ENGINEERING CORPORATION, OF NEWARK, NEW JERSEY, A CORPORATION OF NEW JERSEY.

MOTOR VEHICLE.

Application filed February 14, 1925. Serial No. 9,260.

*To all whom it may concern:*

Be it known that I, EDWARD J. MALONE, Jr., a citizen of the United States, residing at Montclair, in the county of Essex and State of New Jersey, have invented certain new and useful Improvements in Motor Vehicles, of which the following is a specification, like characters on the drawings and in the specification designating like parts.

This invention relates to motor vehicles, and is of particular utility for use upon the standard type of Ford car, although I contemplate the use of my improvements in any field for which they are adapted by their nature.

An important object of the invention is to provide such a motor vehicle with means, operable without displacement of the cover of the transmission case or case containing the speed-controlling bands or similar mechanism, to effect adjustment of said bands, and further to permit such adjustment while the foot-board remains in place above the aforesaid casing, so that the driver of the vehicle can effect adjustments of the speed-controlling mechanism from within the personally occupied compartment without disturbing any part of the vehicle, and preferably while occupying his usual driving position.

Thus I make it possible to adjust the speed bands and brake bands while the engine is running, and even while the car is in motion, which permits the driver to test the effect of his adjustments in the most effective manner, and to regulate them so as to meet promptly the conditions arising in use of such vehicles, avoiding many causes of accident which ensue upon the neglect of such adjustments. This neglect is sometimes willful, arising from a natural indisposition to disturb the parts of the car, and is also due at times to the ignorance of mechanism which prevails with many of the users of such vehicles, and to the lack of facilities for effecting the adjustments.

Accordingly, a further object of the invention is to provide actuating means for the adjusting devices that can be operated by the simple action of a screwdriver or similar instrument of universal use, rather than by any special tool.

A cognate object is to provide actuating means of such a character that they can be installed upon existing vehicles with a minimum of cost, utilizing the existing adjusting devices with substitution of but few parts, inexpensive in character and readily put in place by persons of limited mechanical experience, without the need for drilling or machining operations, and not adding in any way to the complexity of structure or operation of the conventional adjusting devices.

My improved devices can therefore be carried in stock by dealers in standard accessories, and sold as such, and my claims cover broadly the devices as articles of manufacture for the above purpose.

The various features of the invention will be illustrated and described fully in the accompanying drawings and specification, and pointed out in the claims.

Figure 3:
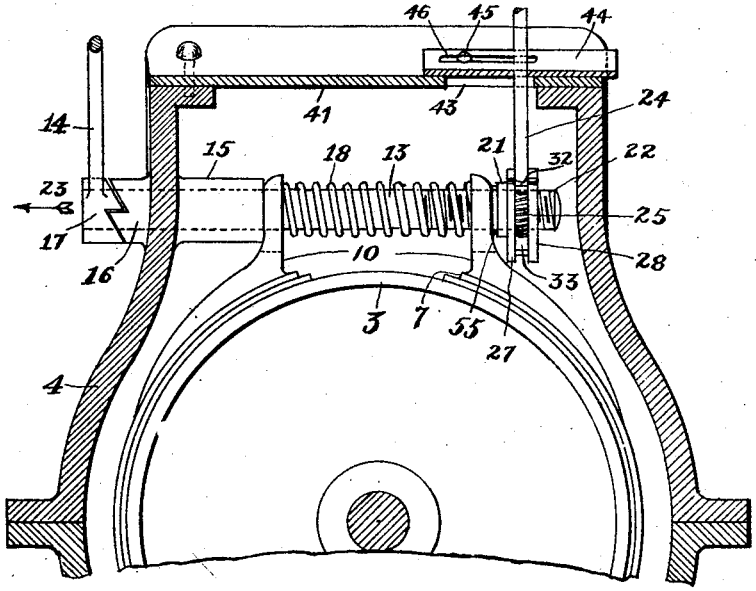
Fig. 3 is a vertical section on the line III—III of Fig. 1.

In the illustrated embodiment, the reference characters 1, 2 and 3 designate respectively the brake drum, the low speed drum and the reverse drum, forming part of the speed-controlling mechanism, and shown as enclosed by a conventional two part casing 4 which also contains the usual operating bands 5, 6 and 7 provided respectively with pairs of lugs 8, 9 and 10 transfixed by actuating bolts 11, 12 and 13 having the well-known actuating foot-levers 14, of which only one is illustrated, in Fig. 3, viz, the reversing lever, mounted on a portion of the bolt 13 which projects through a boss 15 in the side wall of the casing 4, serving at its inner end as an abutment for one of the lugs 10 and formed with a cam 16 on its outer end, to co-operate in well-known fashion with a cam 17 formed with the foot-lever 14.

The above described parts together with the springs 18, which severally tend normally to spread their respective bands, do not require further description, and merely constitute a convenient form of structure with which to illustrate the selected embodiment of my invention, in accordance with which I provide the speed-controlling means with adjusting devices that are operable from within that part of a motor-vehicle which usually constitutes an enclosed compartment for personal occupancy by the driver or other occupants, and while the walls of this compartment, such as the foot-board 19 and dash 20, remain in place, so that the operator can effect the adjustment of the speed bands without leaving his seat or even disturbing the foot-board.

As one convenient form of such adjusting device, I have shown the band-actuating bolts 11, 12 and 13 as each provided with a member 21 which performs the function of the conventional adjusting nut, having an interiorly threaded portion to be screwed on the threaded periphery of the bolt, as at 22, bearing against a washer 55 interposed between the member 21 and the lug 10 at the opposite end of the band from that held by the abutment 15, and acting, when the bolt 13 is drawn in the direction of the arrow 23 by the lever 14, rotating cam 17 against cam 16, to cause the lugs 10 to approach each other and tighten the band.

By turning the nut or member 21 sufficiently in clockwise direction, relatively to its bolt, the band is tightened, or the band may be let-off by turning the member 21 in counter-clockwise direction and as a preferred form of means to actuate each member 21 for such adjustments I have shown each as provided with a shaft 24 formed with a worm 25 which is engaged operatively with a worm gear 26 formed on the hub of the member 21, each shaft being preferably formed as a unitary structure with its member 21, so that the adjusting device as a whole can be made and sold as an article of manufacture for application to existing structures.

Figure 4:
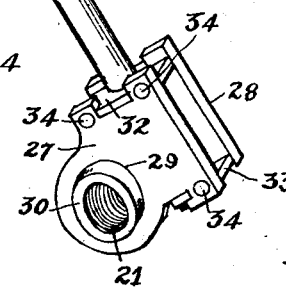
Fig. 4 is a detail in perspective of one of the adjusting devices, isolated.
Figure 5:
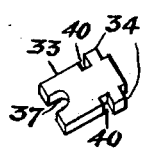
Fig. 5 is an exploded view of the component parts of the adjusting device.
Figure 6:
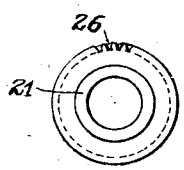
Fig. 6 is a vertical longitudinal section of one of said parts.

Such a device is shown complete in Fig. 4, and comprises the member 21 and shaft 24 already described, combined with a pair of plates, 27 and 28, both like that shown in Fig. 5, each having a bearing 29, which receive the hub-portions 30 and 31 respectively of the member 21, and a pair of smaller connecting plates 32 and 33 having projections 34 which are riveted into holes 35 provided in the plates 27 and 28 respectively. The plate 32 has a bearing 36 for the shaft 24, and by notching the respective plates at 39 and 40, I provide for a very strong interlocking structure when the parts are assembled with the worm 25 engaged with the worm-gear 26, the surrounding cage formed by the plates serving to protect the worm and gear, holding them up to their work, but permitting access thereto of the lubricant splashing in the transmission case, so that special lubricating means are not required.

When the adjusting device is to be placed upon its bolt, as for example the bolt 13 shown in Fig. 3, the bolt is inserted through the boss 15 and lugs 10, with the spring 18 in place, and is engaged with the member 21 and then the latter is screwed on by turning the shaft 24, until the parts are substantially in the position shown in Fig. 3, with the shaft 24 projecting upward through the cover plate 41 of the casing 4, and into a position where it can be readily reached and operated, as for example within a suitable aperture 42 in the foot-board 19, there being one of these apertures preferably for each of the shafts 24, as indicated, although I do not limit myself to the provision of any particular number or shape of the apertures, nor to their specific situation, and I contemplate the provision of adjusting means of any suitable character to permit adjustments, by an operator within a compartment for personal occupancy, of such engine parts outside of said compartment.

Where the adjusting members, such as the nuts 21, are within the transmission casing, and a bolt, as that shown at 13, has an axial movement, in the course of operation, I provide, as an important part of my invention, for an accompanying movement of the member 21 and its shaft 24, and for this purpose I have shown the cover 41 as provided with a slot 43 corresponding to each bolt, in which the shaft 24 is free to move in parallelism with the bolt. Each of these slots preferably is closed by a sliding auxiliary plate 44 held in place by a stud or cap-screw 45 passing through a slot 46.

Figure 1:
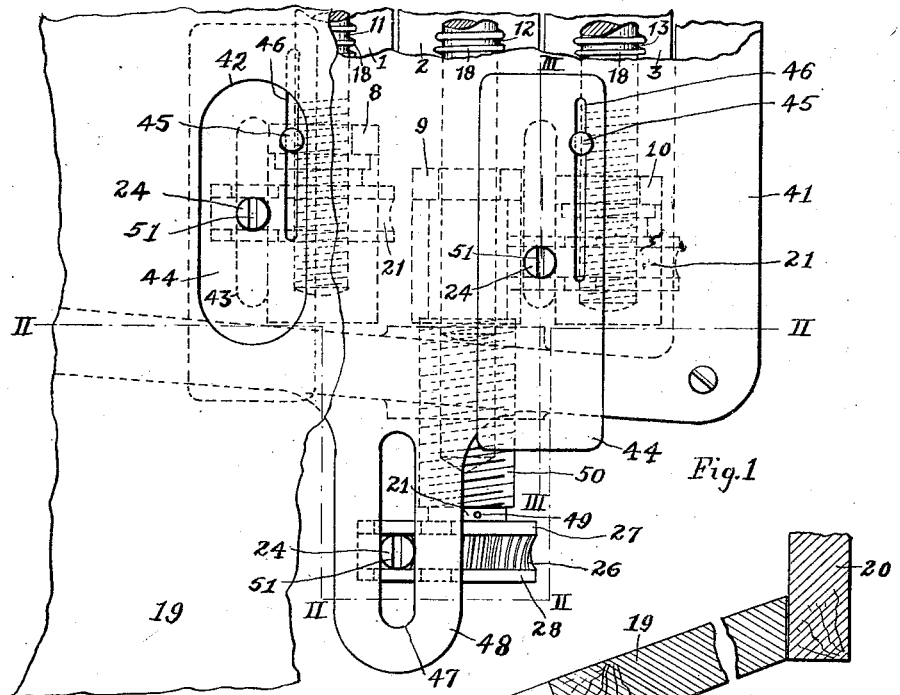
Figure 1 is a plan view of the transmission case of a car of the standard Ford type, enough being shown to illustrate my improvements in place, with a portion of the footboard also appearing.
Figure 2:
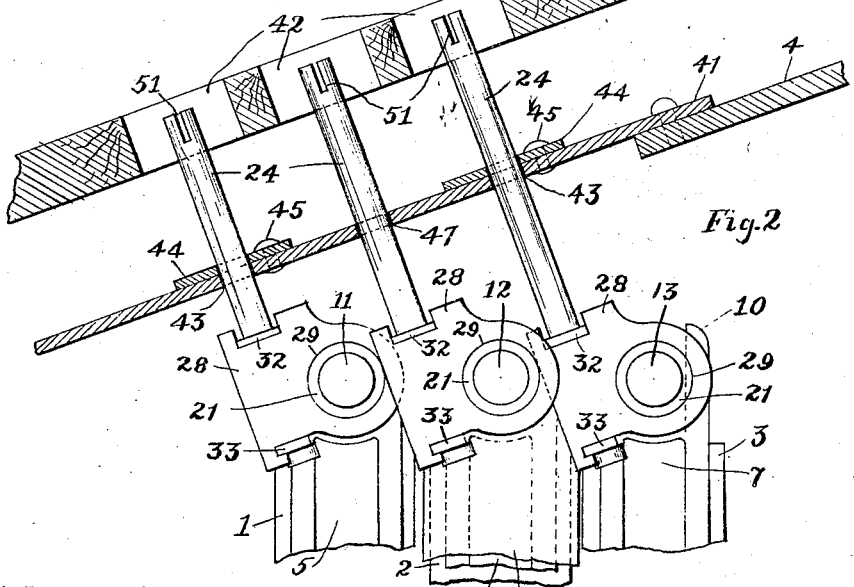
Fig. 2 is a section thereof on the irregular line II—II taken in an upright transverse plane.

This serves to keep the lubricant in, and the dirt out, where the shafts 24 enter the casing, but such provision is not necessary where the member 21 is mounted on a bolt which extends beyond the casing walls, as in the instance of the bolt 12 shown in Fig. 1, and in this instance it is sufficient to provide a slot 47 for the shaft 24, the slot 47 being formed in the instance illustrated in an extension 48 of the cover-plate.

The member 21 for the bolt 12 is preferably provided with a set-screw 49 or other suitable means for holding it firmly upon a reduced part of the adjusting sleeve 50 usually provided for the low speed band.

Each of the shafts 24 is thus conveniently accessible for operation by the driver, who may, without leaving his seat, apply a suitable instrument, such as a key or a screw driver, to the slotted ends 51 of the shafts and thus adjust the speed bands and brake band while the engine is running and, if desired, while the car is in motion, nor is any special skill necessary for such manipulation.

Having illustrated and described my invention thus fully, it is to be understood that I do not limit myself to the particular structure and materials illustrated, nor in general do I limit myself otherwise than as set forth in the claims read in connection with this specification.

I claim:

1. A motor vehicle having a compartment for personal occupancy and a casing enclosing speed-controlling mechanism outside of said compartment, means to actuate said speed-controlling mechanism, and devices to adjust said actuating means, said adjusting devices extending through said casing, and operating means for, and combined with, said adjusting devices and extending into position for operation from within the walls of said compartment.

2. A motor vehicle having a casing enclosing speed-controlling mechanism and a foot-board above said casing, means to actuate said speed-controlling mechanism, and devices to adjust said actuating means, said adjusting devices extending through said casing, and operating means for, and combined with, said adjusting devices and extending into position for operation through said foot-board while the latter remains in place.

3. A motor vehicle having a casing enclosing speed-controlling mechanism including braking mechanism, and a foot-board above said casing, means to actuate said speed-controlling mechanism, and devices to adjust said actuating means, said adjusting devices extending through said casing, and operating means for, and combined with, said adjusting devices and extending into position for operation through said foot-board while the latter remains in place.

4. A motor vehicle having a compartment for personal occupancy, and a casing enclosing speed-controlling mechanism outside of said compartment and provided with a cover, means to actuate said speed-controlling mechanism, and devices to adjust said actuating means, said adjusting devices extending through said cover into position for operation from within the walls of said compartment.

5. In a motor vehicle, a speed-controlling mechanism contained within a casing and a member movable rotatively and co-axially to actuate said speed-controlling mechanism, an adjusting device for said speed-controlling mechanism, said device comprising an adjusting member engaged with said actuating member and sharing its co-axial movement, said adjusting member being rotatable relatively to said speed-controlling mechanism and actuating member for adjustment thereof, and means to actuate said adjusting member rotatively, said actuating means extending through said casing and being arranged to permit said co-axial movements.

6. In a motor vehicle, speed controlling mechanism, an actuating bolt therefor, and an adjusting device for said mechanism, said device comprising a rotatable member on said bolt and an actuating shaft geared to rotate said rotatable member when operated.

7. In a motor vehicle, speed-controlling mechanism comprising a band and an actuating bolt therefor, and an adjusting device for said band, said device comprising a rotatable member on said bolt and an actuating shaft geared to rotate said rotatable member when operated.

8. In a motor vehicle, speed-controlling mechanism comprising a speed-controlling band, an actuating bolt therefor, and an adjusting device for said band, said device comprising a rotatable member on said bolt and an actuating shaft geared to rotate said rotatable member when operated, said rotatable member and its shaft being formed as a unitary structure applicable to, and removable from, said bolt.

9. The combination with a speed-controlling band and an actuating bolt therefor, of a separately formed adjusting device comprising a nut having a worm gear, and a shaft having a worm engaged therewith, said worm gear and shaft being connected to constitute a unitary structure independent of said band and bolt.

10. As an article of manufacture, an adjusting device of the class described, comprising a nut mounted rotatably in a supporting frame and provided with a worm-gear, and an operating shaft also carried by said frame and provided with a worm meshing with said worm-gear, said instrumentalities constituting a unitary structure.

11. As an article of manufacture, a cover for a transmission casing of the type containing speed-regulating mechanism and adjusting devices therefor, said cover having apertures to permit extension of said adjusting devices through said cover and to co-operate in positioning the same in operation.

12. As an article of manufacture, a cover for a transmission casing of the type containing speed-regulating mechanism and adjusting devices therefor, said cover having elongated apertures to permit extension of said adjusting devices through said cover and to co-operate in positioning the same in operation and means to prevent passage of lubricant or dirt through said apertures while permitting movements of said adjusting devices bodily along said aperture.

Signed at New York, in the county of New York, and State of New York, this 16th day of January, 1925.

EDWARD J. MALONE, Jr.